(12) United States Patent
Williams

(10) Patent No.: US 8,441,786 B2
(45) Date of Patent: May 14, 2013

(54) ELECTRONIC CONNECTORS AND FORM FACTOR ADAPTERS FOR ELECTRONIC COMPONENTS

(75) Inventor: Carl D. Williams, Colorado Springs, CO (US)

(73) Assignee: Jabil Circuit, Inc., St. Petersburg, FL (US)

( * ) Notice: Subject to any disclaimer, the term of this patent is extended or adjusted under 35 U.S.C. 154(b) by 291 days.

(21) Appl. No.: 12/726,714

(22) Filed: Mar. 18, 2010

(65) Prior Publication Data

US 2011/0069443 A1 Mar. 24, 2011

Related U.S. Application Data

(60) Provisional application No. 61/244,574, filed on Sep. 22, 2009.

(51) Int. Cl.
*G06F 1/16* (2006.01)
*H05K 5/00* (2006.01)
*H05K 7/00* (2006.01)

(52) U.S. Cl.
USPC .................................. 361/679.33; 361/760

(58) Field of Classification Search ............ 361/679.33–679.39, 760, 767–770; 439/157, 247, 374
See application file for complete search history.

(56) References Cited

U.S. PATENT DOCUMENTS

| | | | |
|---|---|---|---|
| 4,548,451 A * | 10/1985 | Benarr et al. | 439/85 |
| 4,941,841 A * | 7/1990 | Darden et al. | 361/679.39 |
| 5,324,205 A * | 6/1994 | Ahmad et al. | 439/66 |
| RE35,915 E * | 10/1998 | Hastings et al. | 439/377 |
| 5,886,869 A * | 3/1999 | Fussell et al. | 361/679.31 |
| 6,038,130 A * | 3/2000 | Boeck et al. | 361/735 |
| 6,268,977 B1 * | 7/2001 | Yamada et al. | 360/99.06 |
| 7,053,478 B2 * | 5/2006 | Roper et al. | 257/686 |
| 7,066,751 B2 * | 6/2006 | Chen | 439/247 |
| 7,137,837 B2 * | 11/2006 | Chen et al. | 439/247 |
| 7,459,629 B2 * | 12/2008 | Chen | 174/50 |
| 7,548,418 B2 * | 6/2009 | Martin et al. | 361/679.37 |
| 7,903,401 B2 * | 3/2011 | Lee et al. | 361/679.33 |
| 2004/0214463 A1 * | 10/2004 | Chen | 439/247 |
| 2005/0117249 A1 * | 6/2005 | Spychalla | 360/98.04 |
| 2006/0044674 A1 * | 3/2006 | Martin et al. | 360/97.01 |
| 2006/0050429 A1 * | 3/2006 | Gunderson et al. | 360/97.01 |
| 2006/0061953 A1 * | 3/2006 | Le | 361/684 |
| 2006/0199409 A1 * | 9/2006 | Chen et al. | 439/247 |
| 2008/0037211 A1 * | 2/2008 | Martin et al. | 361/685 |
| 2008/0239650 A1 * | 10/2008 | Fujie et al. | 361/685 |
| 2008/0239651 A1 * | 10/2008 | Curnalia et al. | 361/685 |
| 2009/0091884 A1 * | 4/2009 | Walker et al. | 361/679.37 |
| 2011/0069441 A1 * | 3/2011 | Killen et al. | 361/679.33 |

* cited by examiner

*Primary Examiner* — Adrian S Wilson

(57) ABSTRACT

A system and method for installing a peripheral device on a printed circuit board (PCB) is provided. In the system and method, the PCB has a board connector portion and the peripheral device has a device connector portion. The method includes providing a connector adapter housing enclosing a first mating portion configured for mating with the board connector portion and a second mating portion configured for mating with the device connector portion. The method also includes engaging the second mating portion with the device connector portion to position the first mating portion to extend substantially perpendicular to the surface of the PCB. The method further includes depositing the peripheral on the PCB using a motion substantially perpendicular to the surface of the PCB, the motion engaging the board connector portion and the first mating portion.

20 Claims, 6 Drawing Sheets

ELECTRONIC CONNECTORS AND FORM FACTOR ADAPTERS FOR ELECTRONIC COMPONENTS

CROSS REFERENCE TO RELATED APPLICATIONS

The present application claims the priority of U.S. provisional patent application Ser. No. 61/244,574 filed Sep. 22, 2009, entitled "Serial Contact or Compression Connector" and is incorporated herein in its entirety.

FIELD OF THE INVENTION

The present invention relates to adapters, and more specifically to electronic connector adapters and form factor adapters for electronic components.

BACKGROUND

Many conventional electronic devices consist of a main component, such as a motherboard, and additional supporting components, such as storage devices and input/output devices. In general, the supporting components for such electronic devices are connected to the main component using a receptacle-type connector assembly system. In some devices, the main and supporting components of the electronic device will each be designed with a male connector having a plurality of electrical contacts or pins within. A cable with female connectors corresponding to the male connectors is then provided to span the physical gap between the main component and the supporting component. For example, ribbon cables are commonly used in computing devices, such as handheld, laptop, and desktop computers.

As the demand for portable electronic devices has increased, the need for reducing weight and space requirements of such devices has also increased. Accordingly, in an effort to reduce the amount of space needed for the portable electronic device, many electronic device designs have been modified by eliminating the need for cables. In particular, the male connector on either the main component or the supporting component has been replaced in many devices with a female connector to allow the supporting component to be directly connected to the main component. Unfortunately, many types of electronic devices use supporting components designed and manufactured according to standardized configurations, such as data hard disc drives. As a result, electronic device designers must generally design the main component of an electronic device to accommodate connection of the standardized component. This can represent a challenge for designers, as standardized configurations are typically difficult to integrate into many types of portable device designs.

SUMMARY

Embodiments of the invention provide electronic connector adapters and adapter systems and devices using such electronic connector adapters. In a first embodiment of the invention, a method for installing on a printed circuit board (PCB) having a board connector portion and a peripheral device having a device connector portion is provided. In the method, one of the board connector portion and the device connector portion provide a first connector extending perpendicular to a surface of the PCB and another of the board connector portion and the device connector portion provide a second connector extending parallel to the surface of the PCB. The method includes providing a connector adapter housing enclosing a first mating portion for mating with the board connector portion and a second mating portion for mating with the device connector portion. The method also includes engaging one of the first and the second mating portions with the second connector to position an other of the first and the second mating portions to extend perpendicular to the surface of the PCB. The method further includes depositing the peripheral on the PCB using a motion substantially perpendicular to the surface of the PCB, the motion causing the other of the first and the second mating portions and the first connector to engage.

In a second embodiment of the invention, a method for installing a peripheral device on a printed circuit board (PCB) is provided. The PCB has a board connector portion and the peripheral device has a device connector portion, where the device connector portion extends substantially parallel to a surface of the PCB and the board connector portion extends substantially perpendicular to the surface of the PCB. The method includes providing a connector adapter housing enclosing a first mating portion configured for mating with the board connector portion and a second mating portion configured for mating with the device connector portion. The method also includes engaging the second mating portion with the device connector portion to position the first mating portion to extend substantially perpendicular to the surface of the PCB. The method further includes depositing the peripheral on the PCB using a motion substantially perpendicular to the surface of the PCB, the motion engaging the board connector portion and the first mating portion.

In a third embodiment of the invention, a system for electrically interconnecting at least one disc drive having a first dimensional footprint to an external computing environment is provided. The system includes an external printed circuit board (PCB) separate from the disc drive, the external PCB having one or more PCB electrical connection pads. The system also includes a disc drive PCB connected to a bottom surface of the disc drive and having at least one disc drive connector portion. The system further includes a connector attached to the disc drive connector portion, the connector includes a housing, at least one socket formed on a first surface of the housing for mating with the disc drive PCB connector portion, and a plurality of spring loaded contact pads formed on a second surface of the housing. In the system, the plurality of spring loaded contact pads are springingly biased against the PCB electrical connection pads when the disc drive is deposited on the external PCB such that a solderless connection is formed between the disc drive connection portion and the external PCB. Furthermore, the housing is configured to have a size and shape such that a combined dimensional footprint of the disc drive and the connector is substantially the same as the first dimensional footprint when the connector is attached to the disc drive connector portion.

In a fourth embodiment of the invention, a connector adapter is provided. The connector adapter can include a housing, a plurality of spring-loaded contact pads extending from a first surface of the housing, and at least one socket formed in a second surface of the housing. The socket includes a plurality of contact elements electrically coupled to the plurality of spring-loaded contact pads and is adapted to receive at least a portion of a device connector of an external device. In the connector adapter, the plurality of contact elements are configured to be springingly biased against the portion of the device connector inserted into the socket are further configured to electrically couple one of a plurality of electrical elements in the portion of the device connector to one of the plurality of spring-loaded contact pads. Furthermore, the housing is configured to have a size and shape such that a combined dimensional footprint of the peripheral device and the housing and a dimensional footprint of the peripheral device alone are substantially the same when the portion of the device connector is inserted into the socket.

In a fifth embodiment of the invention, a storage system is provided. The system includes a mass storage device having a drive form factor, the mass storage device having a drive connector for providing an external electrical interface to the storage device when connecting to an external computing environment. The system also includes a printed circuit board (PCB), separate from the storage device, that forms part of a computing environment external to the mass storage device, the PCB having a plurality of electrical connection pads for electrically interfacing with the mass storage device. The system further includes a connector adapter attached to the drive connector, the connector adapter includes a housing, at least one socket formed on a first surface of the housing for receiving and mating with the drive connector, and a plurality of contact pads formed on a second surface of the housing. In the system, the mass storage device is removably attached to the PCB in a flat surface mounted arrangement, such that the plurality of contact pads on the connector adapter is biased against the plurality of PCB electrical connection pads to electrically interconnect the mass storage device and the PCB.

In a sixth embodiment of the invention, a system is provided for electrically interconnecting at least one storage device having a first dimensional footprint to an external computing environment. The system includes an external printed circuit board (PCB) separate from the storage device, the external PCB having one or more PCB electrical connection elements. The system further includes a storage device PCB connected to a bottom surface of the storage device and having at least one storage device connector portion. The system also includes a connector attached to the storage device connector portion, the connector includes a housing, at least one socket formed on a first surface of the housing for mating with one of the storage device PCB connector portion and the PCB electrical connection elements, and a plurality of spring loaded contact pads formed on a second surface of the housing. In the system, the plurality of spring loaded contact pads are springingly biased against an other of the storage device PCB connector portion and the PCB electrical connection elements when the storage device is deposited on the external PCB such that a solderless connection is formed between the storage device connection portion and the external PCB, and the housing is configured to have a size and shape such that a combined dimensional footprint of the storage device and the connector is substantially the same as the first dimensional footprint when the connector is attached to the storage device connector portion.

DETAILED DESCRIPTION

Figure 1:
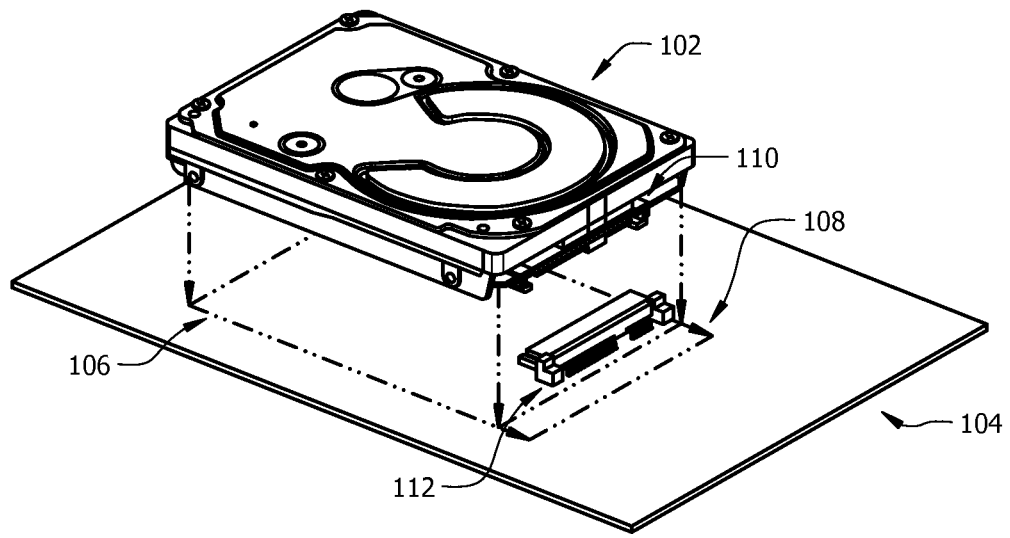
FIG. 1 illustrates conventional flat surface mounting of a hard disc drive on a motherboard.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As described above, one of the main challenges in designing portable devices is accommodating components that have standardized configurations, particularly during assembly. For example, a conventional hard disc drive is substantially flat (i.e., its side surfaces are substantially smaller than its top and bottom surfaces), but the electrical connectors in such hard disc drives are generally located along side surfaces. Accordingly, flat surface mounting of such hard disc drive devices on, for example, a motherboard is non-trivial. This is illustrated in FIG. 1. FIG. 1 illustrates conventional flat surface mounting of a hard disc drive 102 on motherboard 104. As shown in FIG. 1, flat surface mounting of hard disc drive 102 requires defining an initial placement area 106 on the motherboard 104. This configuration also requires defining a motion area 108 on the motherboard 104 to allow motion of hard disc drive 102 in a direction parallel to the surface of motherboard 104. That is, an area in addition to area 106, that defines the travel area of the end of disc drive 102 with a drive connector 110 along the surface of motherboard 104 to engage a motherboard connector 112 on the motherboard 104.

This conventional configuration suffers from several problems. First, if the hard disc drive 102 is added after the motherboard 104 is placed in a housing, additional space in at least the housing must be provided to accommodate the lateral motion of the hard disc drive 102 during assembly. Second, since the hard disc drive 102 must be moved over the surface of motherboard 104, areas 106 and 108 must be substantially devoid of components that could be damaged during motion of the hard disc drive 102. Accordingly, at least a portion of areas 106 and 108 may be unavailable for some types of components. Such components can be relocated to other portions of motherboard 104, but this potentially increases the size of the resulting electronic device. Third, connectors, such as connector 110 or 112, typically include pins or other protruding portions, as described above, which are susceptible to damage due to mishandling. Finally, the force typically required to insert connector 110 into connector 112 is significant. Accordingly, if the hard disc drive 102 is not properly positioned over motherboard 104, the applied force can damage connector 110 or connector 112, or even damage hard disc drive 102 or motherboard 104.

To overcome the various limitations of conventional component mounting configurations in electronic devices, embodiments of the invention provide an electrical connector adapter, with a minimum footprint, for surface mounting electronic device components. In particular, an adapter in accordance with an embodiment of the invention is configured have a first surface with at least one socket for receiving a male or female connector of an existing component and second surface with a plurality of spring loaded pads for contacting a plurality of pads on another component, such as on a surface of a motherboard. This configuration is conceptually illustrated with respect to FIG. 2.

Although the various embodiments of the invention will be principally illustrated with respect to the mounting of hard disc drive components, the invention is not limited in this regard. Rather, the various embodiments of the invention can be used with any type of components for an electrical device, including, but not limited to input/output devices, memory modules, and other peripheral devices.

Figure 2:
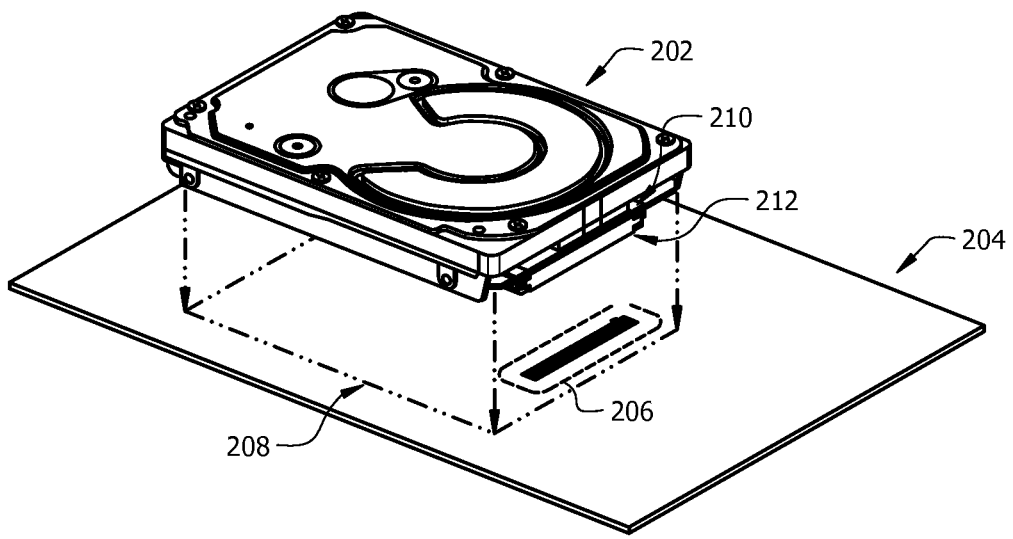
FIG. 2 conceptually illustrates flat surface mounting of a hard disc drive on a motherboard using an electrical connector adapter in accordance with an embodiment of the invention.

FIG. 2 conceptually illustrates surface mounting of a hard disc drive on a motherboard using an electrical connector adapter in accordance with an embodiment of the invention. Similar to the configuration in FIG. 1, the configuration in FIG. 2 also shows a hard disc drive 202, a mass storage device, with a standardized hard disc drive connector 210 and a motherboard 204. However, the configuration of FIG. 2 varies from the configuration of FIG. 1 in several ways. First, rather than providing a motherboard connector, as in FIG. 1, the motherboard 204 includes a plurality of pads 206 for receiving signals from hard disc drive 202. This simplifies board design and manufacturing complexity. Second, the hard disc drive connector 210 is fitted with an electrical connector adapter 212. The electrical connector adapter 212 includes a socket for receiving the electrical connector 210 and a plurality of spring-loaded pads (not shown) for contacting pads 206.

As a result of the configuration of FIG. 2, several advantages are provided. First, no additional lateral space must be provided to accommodate motion of the hard disc drive 202. As shown in FIG. 2, to electrically connect hard disc drive 202 to motherboard 204, the hard disc drive 202 is directly positioned on motherboard 204 such that the spring-loaded pads on adapter 212 line up with pads 206. This permits, among other things, a pick and place assembly process to be used for manufacturing, which can significantly reduce costs. Second, the hard disc drive 202 need not be moved over the surface of motherboard 204 during installation. As a result, an area 208 beneath hard disc drive 202 can be used to place some components on motherboard 204 without risk of damaging them. Therefore, space requirements can be reduced, resulting in potentially smaller electronic devices. Third, since adapter 212 effectively eliminates exposed protruding connector components, such as those in connector 210, the likelihood of these connector components being damaged during installation of the hard disc drive 202 is minimized. Finally, since no force is required to connect pads 206 and the spring loaded pads on adapter 212 (other than the force required to position hard disc drive 202), the likelihood of damaging hard disc drive 202 or mother board 204 during assembly is reduced or eliminated as well.

Figure 3:
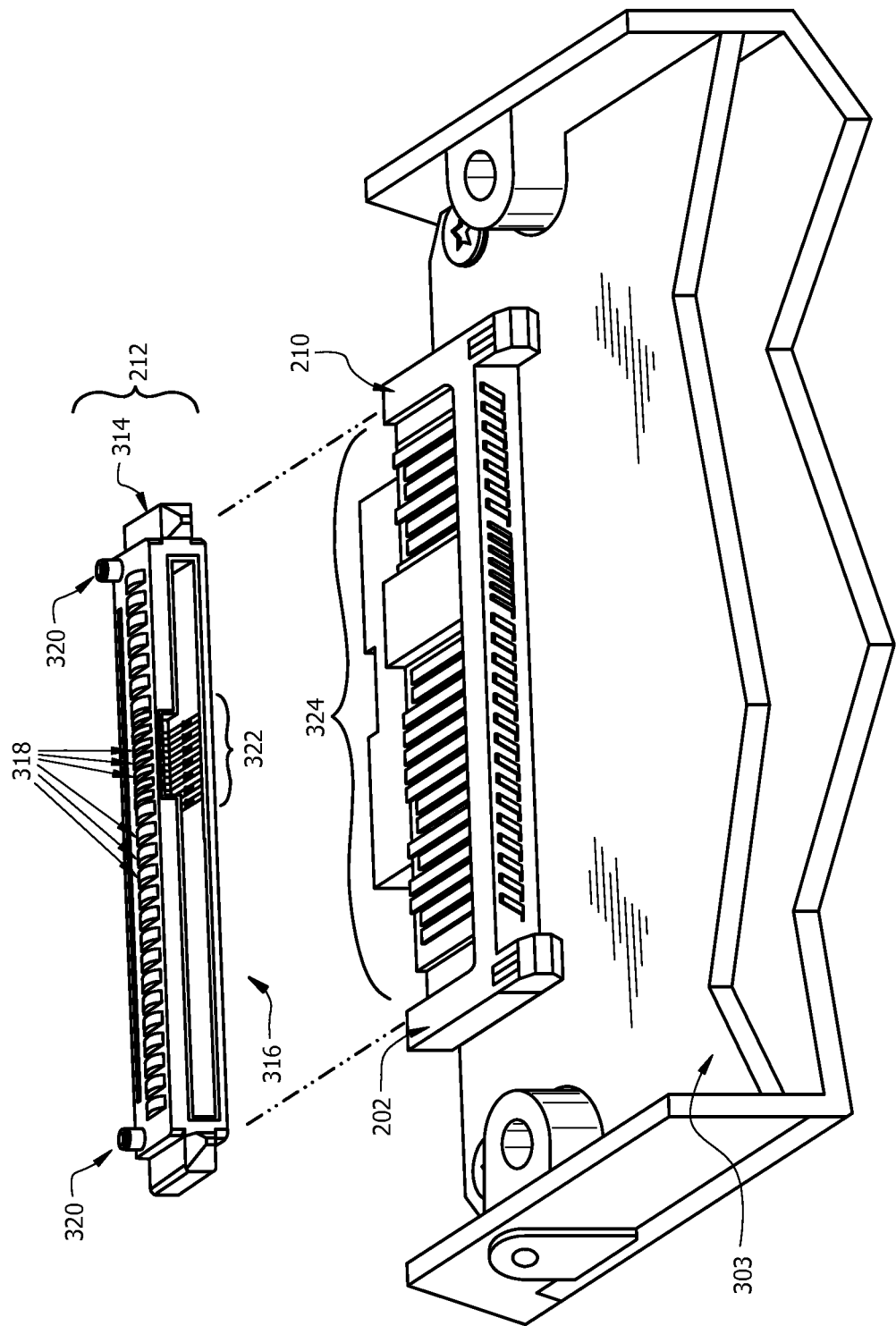
FIG. 3 shows a perspective view of the electrical connector adapter and the drive FIG. 2, prior to connection.
Figure 4:
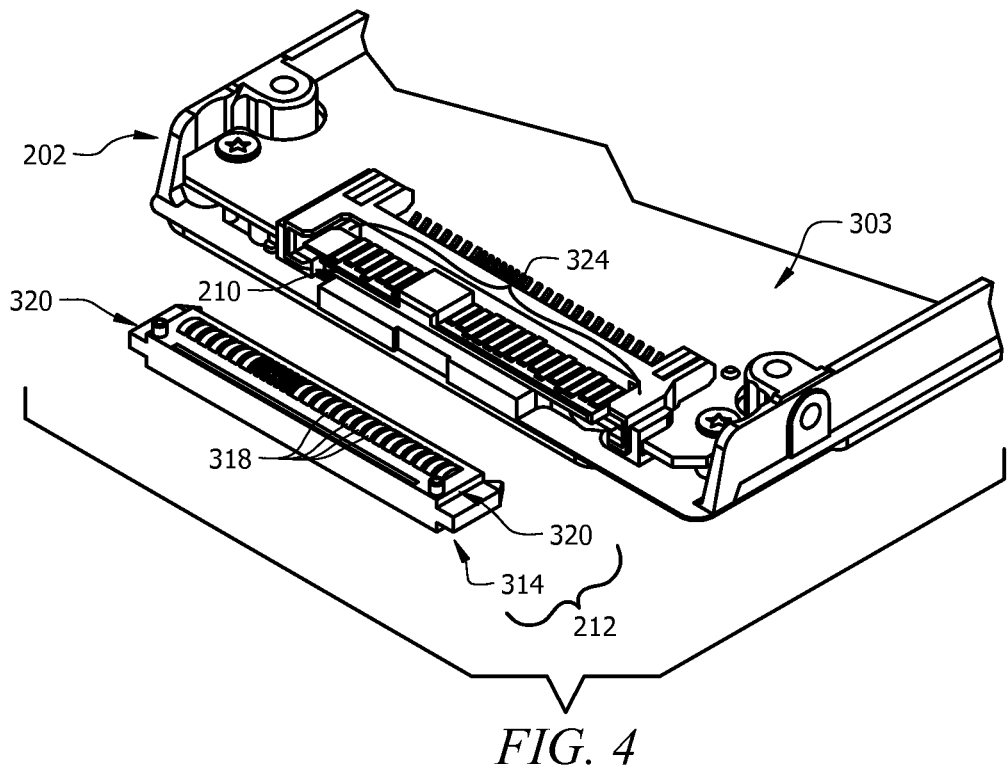
FIG. 4 shows a perspective view of the electrical connector adapter and the drive FIG. 2, prior to connection.
Figure 5:
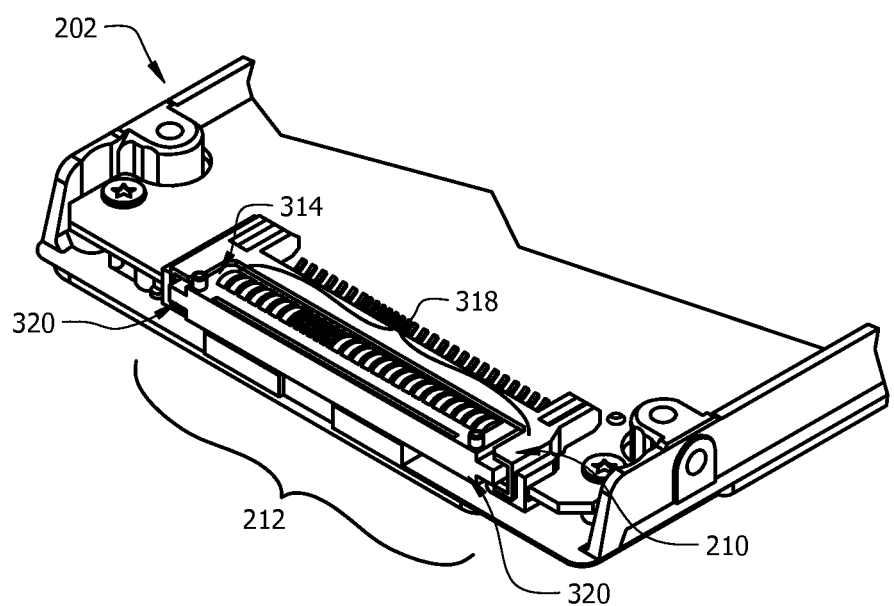
FIG. 5 shows a perspective view of the electrical connector adapter and the drive FIG. 2, after connection.

Electrical connector adapter 212 will now be described in greater detail below with respect to FIGS. 3, 4, and 5. FIGS. 3 and 4 show perspective views of the exemplary electrical connector adapter 210 and drive 202 in FIG. 2, prior to connection. FIG. 5 shows another perspective view of the arrangement in FIGS. 3 and 4, after connecting adapter 212 and drive 202. As shown in FIGS. 3-5, adapter 212 comprises a housing 314, at least one socket 316, and a plurality of spring-loaded contact pads 318. Further, FIGS. 3-5 show the bottom side of disc drive 202 that normally faces the motherboard.

As used herein with respect to a contact pad or other electrically conductive element, the term "spring-loaded" means that the electrically conductive element includes or is combined with at least one elastically deformable portion. This elastically deformable portion is configured to cause a change in the position or configuration of the contacting portion of the electrically conductive element when force is applied against the electrically conductive elements. For example, in one embodiment of the invention, the plurality of spring-loaded contact pads 318 can comprise a series of leaf-type springs constructed from an electrically conductive composition. However, the invention is not limited in this regard and other types of configurations can be used to provide spring-loaded contact pads.

The configuration in FIGS. 3-5 is effectively a right angle adapter. That is, when an electrical connector 210 of drive 202 is completely inserted into socket 316, the plurality of pads 318 extend in a direction substantially perpendicular to a bottom surface 303 of drive 202, as shown in FIGS. 3-5. As a result, drive 202 can be positioned on a motherboard over pads formed thereon, as described above with respect to FIG. 2.

In the various embodiments of the invention, the housing, socket, and pads in an adapter can be configured to provide any shape or to have any dimensions. However, in some embodiments of the invention, the shape and size of the adapter can be selected such that a combined dimensional footprint of the adapter and associated component is substantially the same as the dimensional footprint of the associated component alone. For example, in the embodiment illustrated in FIGS. 3 and 4, the shape and dimensions of housing 314, socket 316, and pads 318 for adapter 212 are selected such that when a drive connector 210 of drive 202 is completely inserted into socket 306, little or no portions of housing 314 and pads 318 extending beyond a volume defined by the outermost dimensions of drive 202. Consequently, the dimensional footprint of drive 202 is substantially unchanged after the addition of connector housing.

The term "dimensional footprint", as used herein, refers to the footprint of a device in terms of area or volume. The term "substantially" as used herein with respect to a quantity, means that the quantity can vary by 10% with respect to a reference quantity.

In some embodiments of the invention, adapter 212 can be configured to include one or more features to facilitate mounting of hard disc drive 202 (including adapter 212) in an electronic device. For example, as shown in FIG. 3-5, one or more guide projections 320 can extend from housing 314. In the embodiment illustrated in FIGS. 3-5, the guide projections 320 comprise posts extending substantially in the same direction as pads 318. The guide projections 320 can be configured to mate with openings or other features in an electronic device to facilitate alignment of pads 318 with corresponding pads in the electronic device.

In the various embodiments of the invention, a socket of an electrical connector adapter can be configured in a variety of ways. For example, as shown in FIG. 3, socket 316 is a female microstrip connector configured for receiving connector 210, comprising a male microstrip connector. In addition to being dimensioned to receive the male microstrip connector, socket 316 can include one or more spring-loaded contact elements 322. The contact elements 322 are configured to electrically couple each of microstrip elements 324 of connector 210 to one of pads 318. In some embodiments of the invention, the contact elements 322 are configured to be resiliently biased against the microstrip elements 324. In such embodiments of the invention, the contact elements 322 can also provide enough force to retain connector 210 in socket 316 without the need for additional fasteners. However, the invention is not limited in this regard and a fastening system can be provided to retain connector 210 in socket 316. For example, one or more fasteners can be used to attach adapter 212 to drive 202.

In the embodiment illustrated in FIGS. 3-5, adapter 212 is illustrated as including a socket for engaging connector 210 of drive 202 and pads 318 for contacting pads 206 on motherboard 204. However, the various embodiments of the invention are not limited in this regard. In some embodiments of the invention, adapter 212 can be configured to provide a reverse configuration. That is, an adapter in accordance with an embodiment of the invention can instead be configured to include a socket for engaging a connector on motherboard and pads for contacting pads of a hard disc drive or other component to be mounted on the motherboard.

Figure 6:
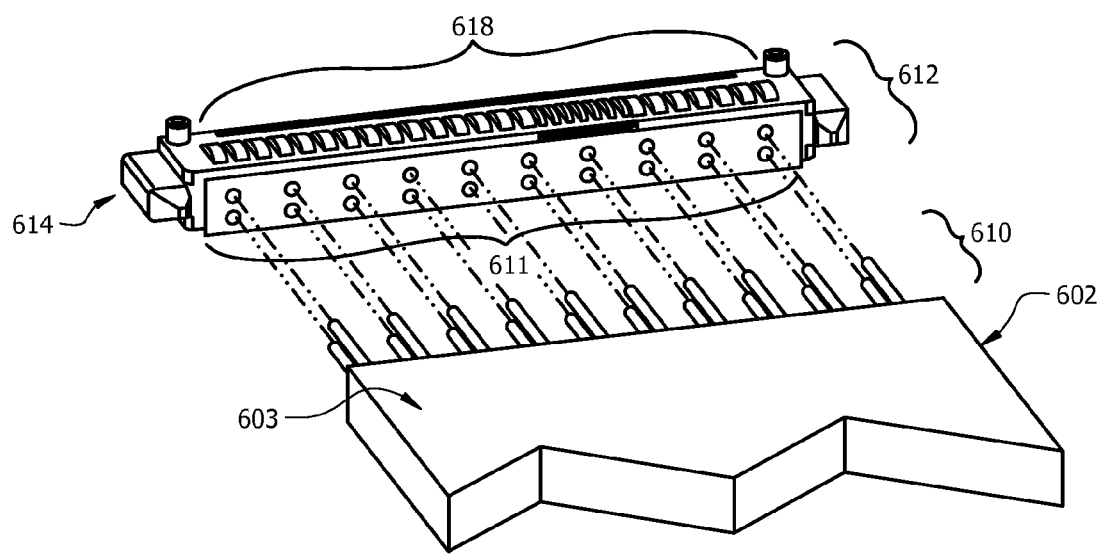
FIG. 6 shows a perspective view of another exemplary electrical connector adapter and a device with pin-type connectors, prior to connecting, in accordance with an embodiment of the invention.

Further, although FIG. 3 shows only a male micro strip connector configuration, the various embodiments of the invention are not limited in this regard. Rather, the various embodiments of the invention can be used to provide electrical connector adapters for any other type of connector configuration, including male connectors, female connectors, or any combination thereof. For example, in addition to male or female microstrip connectors, the various embodiments of the invention are equally applicable to pin-type connectors. For example, FIG. 6 shows a perspective view of another exemplary electrical connector adapter 612 and a device 602 with pin-type connectors 610, prior to connecting, in accordance with an embodiment of the invention.

Similar to the adapter in FIGS. 3-5, adapter 612 also comprises a housing 614, a plurality of sockets 616, and a plurality of spring-loaded contact pads 618. The configuration in FIG. 6 is also effectively a right angle adapter. That is, when pins 610 of device 602 are completely inserted into sockets 616, the plurality of pads 618 extend in a direction perpendicular to a bottom surface 603 of device 602, as shown in FIG. 5. As a result, device 602 can be positioned on a motherboard over pads formed thereon, as described above with respect to FIG. 2-5.

In the various embodiments of the invention, the sockets 616 can be configured in a variety of ways for contacting and retaining pin-type connectors. For example, in addition to being dimensioned to receive pin-type connector 610, sockets 616 can include one or more spring-loaded contact elements (not shown) within housing 614. These contact elements are configured to electrically couple each of pin-type connectors 610 to one of pads 618. In some embodiments of the invention, such contact elements can be configured to be springingly biased against the pin-type connectors 610. In such embodiments of the invention, these contact elements can also provide enough force to retain pin-type connectors 610 in sockets 616 without the need for additional fasteners. However, the invention is not limited in this regard and a fastening system can be provided to pin-type connectors 610 in sockets 616. For example, one or more fasteners can be used to attach adapter 612 to device 602.

Figure 7:
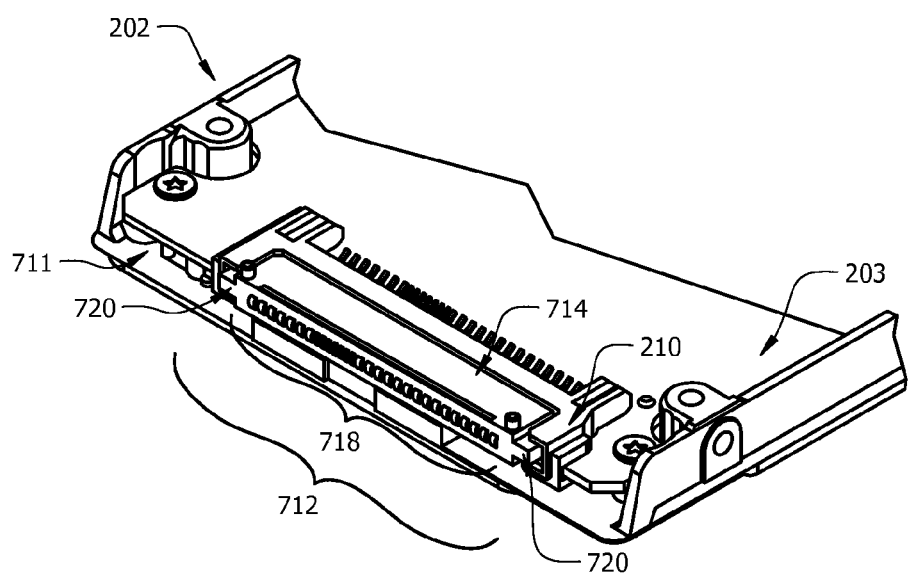
FIG. 7 shows a perspective view of an alternate connector adapter connected to a disc drive in accordance with an embodiment of the invention.

Although the exemplary embodiments described above provide right angle adapters, the various embodiments of the invention are not limited in this regard. In other embodiments of the invention, the plurality of spring-loaded contact pads can be configured to extend in other directions. This is illustrated in FIG. 7. FIG. 7 shows a perspective view of an alternate connector adapter 712 connected to drive 202. Similar to the configuration in FIGS. 3-5, the configuration in FIG. 7 also includes an adapter 712 coupled to a hard disc drive connector 210 of a 2.5 serial ATA hard disc drive 202. The adapter 712 also comprises a housing 714, at least one socket (not shown), and a plurality of spring-loaded contact pads 718. In the configuration shown in FIG. 7, the contact pads 718 extend in a direction perpendicular to an edge 711 on which connector 210 is located. Such a configuration allows hard disc drive 202 to be mounted in a substantially vertical orientation as opposed to the substantially horizontal orientation illustrated in FIG. 2.

As described above, using electrical connector adapters in accordance with the various embodiments of the invention provides several advantages with respect to mounting components in electronic devices. However, electrical connector adapters in accordance with the various embodiments of the invention can also be used to provide form factor adapters for some types of applications.

For example, many types of servers typically utilize removable drive storage systems. In general, a hard disc drive for such a server is generally mounted in a carrier that can be removeably installed in a server system. Over time, the increasing storage needs of the server are typically met by adding additional drives, each mounted individually in a carrier. However, such a configuration typically faces two problems over time. First, such server systems typically have a finite number of slots for adding additional drive carriers. Accordingly, a new server system or at least a significant hardware and/or software upgrade is needed to add additional drive carriers. Second, as hard disc drive technologies evolve over time, they are generally applied to hard disc drives with smaller form factors. Accordingly, the storage capacity of a server having drive carriers configured for older form factors is effectively limited by the extent such advanced hard disc drive technologies have been applied to compatible hard disc drives.

However, hard disc drive designs generally conform to particular form factor configurations. In particular, hard disc drive form factors have been generally designed such that the length and width of a hard disc drive of a particular form factor are equal to the width and ½ the length, respectively, of a hard disc drive of a preceding form factor. Furthermore, the height of a hard disc drive of a particular form factor is generally less than or equal to the height of a hard disc drive of a preceding form factor. Consequently, it is typically possible to arrange two or more hard disc drives of a particular form factor in volume previously occupied by a hard disc drive of a preceding form factor.

One problem with many conventional form factor adapters for disc drive is that the connection between the larger form factor disc drive interface and the smaller form factor disc drive must typically be accomplished via the use of ribbon cable-type connectors. However, when attempting to use two or more smaller form factor disc drives in the space of a larger form factor disc drive, it is difficult to route such ribbon-type connectors in the space available. Accordingly, the volume required by such smaller form factor disc drives is effective larger than that of the larger form factor disc drive. Furthermore, the use of ribbon-type connectors is often problematic for maintenance purposes. In particular, removal of a disc drive requires not only that the disc drive be disengaged from the housing, but the manipulation of the ribbon-type cable to electrically disconnect such disc drives. Such manipulations, if occurring frequently, can result in degrading of the ribbon-type connection, requiring replacement or resulting in access errors.

Accordingly, based on the relationship between the different form factors, a form factor adapter using electrical connector adapters in accordance with an embodiment of the invention can be provided. The use of such adapters eliminates the various difficulties associated with ribbon-type connectors, improving reliability of the devices and facilitating maintenance of the systems that the disc drives are attached to. This is shown below with respect to FIG. 8.

Figure 8:
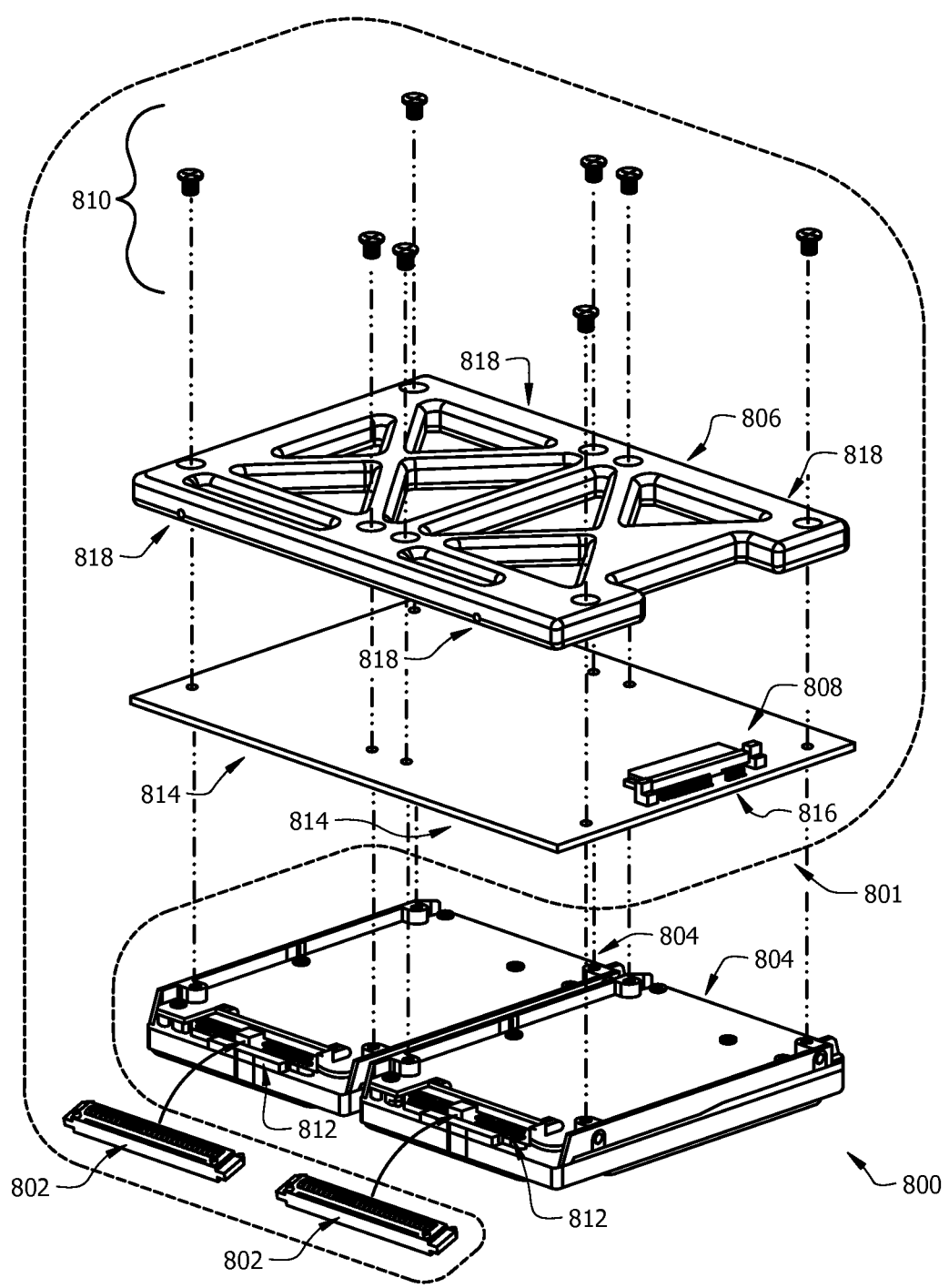
FIG. 8 is an exploded view of a hard disc drive device including a factor adapter having at least one electrical connector adapter in accordance with an embodiment of the invention.

FIG. 8 is an exploded view of a hard disc drive device including a factor adapter system 801 having at least one electrical connector adapter 802 in accordance with an embodiment of the invention. As shown in FIG. 8, a form factor adapter system 801 is provided for mounting two or more hard disc drives 804 in a space of a larger form factor hard disc drive. The form factor adapter includes a supporting frame 806, a circuit board 808, a plurality of fasteners 810, and electrical connector adapters 802.

The hard disc drive device 800 is assembled for use as follows. First, electrical connector adapters 802 are inserted into connectors 812 of hard disc drives 804, as described above with respect to FIGS. 2-5. In the embodiment illustrated in FIG. 8, connector adapters 802 are substantially similar to the connector adapter described above with respect to FIGS. 2-5. The hard disc drives 804 can then be positioned on circuit board 808, such that contacts on each of connector adapters 802 is aligned with contact pads 814 on a surface of board 808. Board 800 can also have a connector 816 and components, circuitry, and/or software for accessing drives 804 via connector 816. Board 808 and hard disc drives 804 can then be positioned on frame 806 and fastened together using fasteners 810. However, the invention is not limited to the assembly process described above. For example, in some embodiments of the invention, board 808 and frame 806 can be fastened together first. Additionally, each of hard disc drives 804 can be fastened separately to board 808 and frame 806.

In the exemplary embodiment illustrated in FIG. 8, the resulting configuration provides a hard disc drive device that is compatible with a form factor of a hard disc drive of a larger form factor. As used herein with respect to form factors, the term "compatible" means that the resulting hard disc drive device mechanically and electrically matches the hard disc drive being replaced. For example, as shown in FIG. 8, hard disc drive device 800 electrically matches a larger hard disc drive being replaced. In particular, board 808 can be configured to have a connector 816 having a same connector type as that of the larger hard disc drive being replaced. Furthermore, connector 816 can be positioned in assembled drive device 800 to match a location of such a connector in the larger hard disc drive being replaced. Hard disc drive 800 also mechanically matches the larger hard disc drive being replaced. In particular, one or more mounting elements 818 can be provided at locations in the frame 806 corresponding to the location of mounting elements in the larger hard disc drive. For example, threaded holes can be provided in frame 806 at the same locations in which threaded holes would be provided in a hard disc drive of a larger form factor. Accordingly, the resulting hard disc drive device 800 can be mechanically attached or installed in an electronic device without any modification of the electronic device. This is illustrated with respect to FIG. 9.

Figure 9:
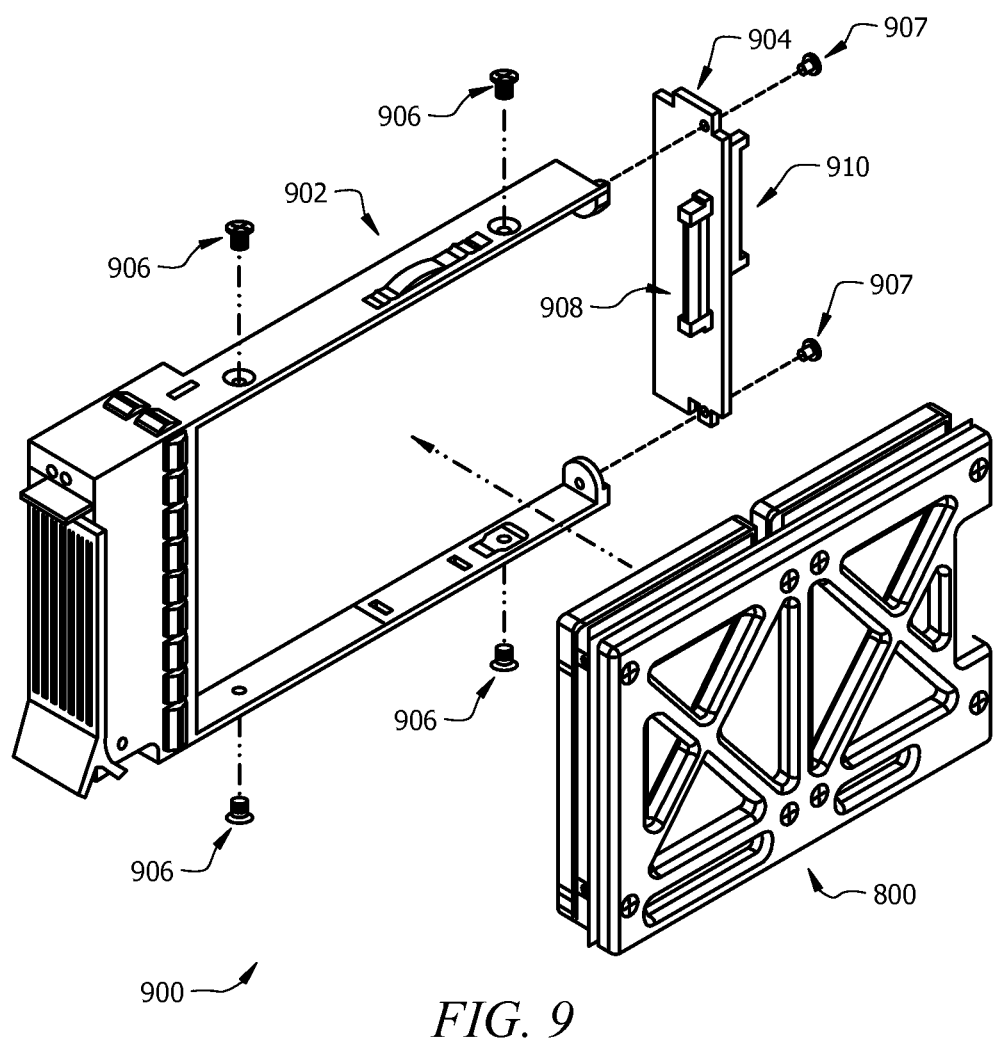
FIG. 9 is an exploded view of a server hard disc drive carrier using the assembled hard disc drive device 800 of FIG. 8.

FIG. 9 is an exploded view of a server hard disc drive carrier 900 using the assembled hard disc drive device 800 of FIG. 8. As shown in FIG. 9, a server drive carrier 900 includes a carrier frame 902 designed for a larger form factor hard disc drive device, a paddle board 904, a plurality of carrier frame fasteners 906, and a plurality of paddle board fasteners 907. Paddle board 904 can include a first paddle connector 908 for connecting paddle board 904 to the larger hard disc drive device. Paddle board 904 can also include a second paddle connector 910 for connecting paddle board 904 to a server (not shown).

Carrier 900, including hard disc drive device 800, can be assembled as follows. First, hard disc drive device 800 can be placed within carrier frame 902 and fixed in place via carrier fasteners 906. Afterwards, paddle board 904 can be attached to hard disc drive device 800 and secured in place using paddle board fasteners 907. In the embodiment illustrated in FIG. 9, the paddle fasteners attach paddle board 904 to the carrier frame 902. However, the various embodiments of the invention are not limited in this regard and other types of drive carriers can be used.

The configuration in FIG. 9 provides several advantages. First, it allows older, slower, larger, and lower capacity hard disc drives to be replaced with two or more newer, faster, smaller, and higher capacity hard disc drives. That is, since the configuration of hard disc drive device 800 is compatible with the form factor of the larger hard disc drive device frame 902 was originally design for, no modification of frame 902 or paddle board 904 is needed. Accordingly, a performance enhancement can be obtained. Second, the configuration in FIG. 9 provides a configuration than can be easily maintained. As described above with respect to FIG. 8, each of the drives in hard disc drive device 800 is attached to the supporting frame of device 800 and is surface mounted using an electrical connector in accordance with an embodiment of the invention. Therefore, since the hard disc drives are not directly attached to carrier frame 902 and no lateral motion of the hard disc drives is necessary for their removal, the drive can be removed without the need to significantly disassemble carrier 900. For example, to remove one of the hard disc drives in device 800, only the fasteners mechanically coupling a hard disc drive to device 800 need be removed. The hard disc drive can then be lifted out of carrier 900. A new drive can then be installed by providing an electrical connector adapter for the hard disc drive and placing and fastening the hard disc drive back to device 800.

While various embodiments of the present invention have been described above, it should be understood that they have been presented by way of example only, and not limitation. Numerous changes to the disclosed embodiments can be made in accordance with the disclosure herein without departing from the spirit or scope of the invention. For example, although a hard disc drive (202, 804) has been shown in the various embodiments, use other types of mass storage devices, such as solid-state drives, with similar form factors, or standardized interfaces requirements are contemplated to be within the scope of this invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method for installing a peripheral device on a printed circuit board (PCB) having a board connector portion, the peripheral device having a device connector portion, one of said board connector portion and said device connector portion providing a first connector extending perpendicular to a surface of said PCB and another of said board connector portion and said device connector portion providing a second connector extending parallel to said surface of said PCB, the method comprising:
   providing a connector adapter housing enclosing a first mating portion for mating with said board connector portion and a second mating portion for mating with said device connector portion;
   engaging one of said first and said second mating portions with said second connector to position an other of said first and said second mating portions to extend perpendicular to said surface of said PCB; and
   depositing said peripheral device on said PCB using a motion substantially perpendicular to said surface of said PCB, said motion causing said other of said first and said second mating portions and said first connector to engage.

2. The method of claim 1, wherein said providing comprises selecting said connector adapter housing to include at least one guide projection for engaging a guide opening in said PCB during said depositing.

3. The method of claim 1, wherein said providing comprises selecting said connector adapter housing to have a size and shape such that a combined dimensional footprint of said peripheral device and said connector adapter housing is substantially the same as a dimensional footprint of said peripheral device alone when said connector adapter housing engages said device connector portion.

4. The method of claim 1, wherein said providing comprises selecting said one of said first and said second mating portions to comprise a plurality of spring-loaded contact elements configured to apply a force against said second connector, such that said connector adapter housing is retained on said second connector portion exclusive of fasteners.

5. A method for installing a peripheral device on a printed circuit board (PCB), said PCB having a board connector portion and said peripheral device having a device connector portion, said device connector portion extending substantially parallel to a surface of said PCB and said board connector portion extending substantially perpendicular to said surface of said PCB, the method comprising:
   providing a connector adapter housing enclosing a first mating portion configured for mating with said board connector portion and a second mating portion configured for mating with said device connector portion;
   engaging said second mating portion with said device connector portion to position said first mating portion to extend substantially perpendicular to said surface of said PCB;
   depositing said peripheral device on said PCB using a motion substantially perpendicular to said surface of said PCB, said motion engaging said board connector portion and said first mating portion.

6. The method of claim 5, wherein said providing comprises selecting said connector adapter housing to include at least one guide projection for engaging a guide opening in said PCB during said depositing.

7. The method of claim 5, wherein said providing comprises selecting said connector adapter housing to have a size and shape such that a combined dimensional footprint of said peripheral device and said connector adapter housing is substantially the same as a dimensional footprint of said peripheral device alone when said connector adapter housing engages said device connector portion.

8. The method of claim 5, wherein said providing comprises selecting said first mating portion to comprise a plurality of spring-loaded contact pads.

9. The method of claim 5, wherein said providing comprises selecting said second mating portion to comprise a plurality of spring-loaded contact elements configured to apply a force against said device connector portion, such that said connector adapter housing is retained on said device connector portion exclusive of fasteners.

10. A system for electrically interconnecting at least one disc drive having a first dimensional footprint to an external computing environment, comprising:
   an external printed circuit board (PCB) separate from the disc drive, the external PCB having one or more PCB electrical connection pads;
   a disc drive PCB connected to a bottom surface of the disc drive and having at least one disc drive connector portion; and
   a connector attached to said disc drive connector portion, the connector comprising a housing, at least one socket formed on a first surface of said housing for mating with said disc drive PCB connector portion, and a plurality of spring-loaded contact pads formed on a second surface of said housing, and
   wherein said plurality of spring-loaded contact pads are springingly biased against said PCB electrical connection pads when the disc drive is deposited on the external PCB such that a solderless connection is formed between the disc drive connection portion and the external PCB, and said housing is configured to have a size and shape such that a combined dimensional footprint of said disc drive and said connector is substantially the same as said first dimensional footprint when said connector is attached to said disc drive connector portion.

11. The system of claim 10, wherein said socket comprises a plurality of spring-loaded contact elements configured to apply a force against said disc drive connector portion such that said connector is retained on said disc drive connector portion exclusive of fasteners.

12. The system of claim 10, wherein said first surface of said housing is substantially perpendicular to said second surface of said housing.

13. The system of claim 10, wherein said connector further comprises at least one connector guide feature, and said external PCB comprises at least one PCB guide feature configured for engaging said connector guide feature when the disc drive is deposited on the external PCB when said plurality of spring-loaded contact pads and said PCB electrical connection pads are in contact.

14. The system of claim 10, further comprising:
a carrier for supporting another disc drive having a second dimensional footprint greater than said first dimensional footprint; and
a supporting frame for mounting said external PCB, said at least one disc drive, and said connector in said carrier, wherein a combined dimensional footprint of said external PCB, said at least one disc drive, and said connector is less than or equal to said second dimensional footprint.

15. A connector adapter for a peripheral device, comprising:
a housing;
a plurality of spring-loaded contact pads extending from a first surface of said housing; and
at least one socket formed in a second surface of said housing, said socket comprising a plurality of contact elements electrically coupled to said plurality of spring-loaded contact pads, and said socket adapted to receive at least a portion of a device connector of said peripheral device, wherein said plurality of contact elements are configured to be springingly biased against said portion of said device connector inserted into said socket, and
wherein each of said plurality of contact elements are configured to electrically couple one of a plurality of electrical elements in said portion of said device connector to one of said plurality of spring-loaded contact pads, and wherein said housing is configured to have a size and shape such that a combined dimensional footprint of said peripheral device and said housing and a dimensional footprint of said peripheral device alone are substantially the same when said portion of said device connector is inserted into said socket.

16. A storage system, comprising:
a mass storage device having a disc drive form factor, the mass storage device having a disc drive connector for providing an external electrical interface to the storage device when connecting to an external computing environment;
a printed circuit board (PCB), separate from the storage device, that forms part of a computing environment external to the mass storage device, the PCB having a plurality of electrical connection pads for electrically interfacing with the mass storage device;
a connector adapter attached to said disc drive connector, the connector adapter comprising a housing, at least one socket formed on a first surface of said housing for receiving and mating with said disc drive connector, and a plurality of contact pads formed on a second surface of said housing;
wherein said mass storage device is removably attached to said PCB in a flat surface mounted arrangement, such that said plurality of contact pads on the connector adapter is biased against said plurality of PCB electrical connection pads to electrically interconnect the mass storage device and the PCB.

17. The storage system of claim 16, wherein: said plurality of contact pads comprise a plurality of spring-loaded contact pads extending from the second surface of said housing; and said socket comprises a plurality of contact elements electrically coupled to said plurality of spring-loaded contact pads, and said socket adapted to receive at least a portion of the drive connector, wherein said plurality of contact elements is configured to be springingly biased against the drive connector when inserted into said socket, and wherein each of said plurality of contact elements are configured to electrically couple one of a plurality of electrical elements in said drive connector to one of said plurality of spring-loaded contact pads, and wherein the housing is configured to have a size and shape such that a combined dimensional footprint of said mass storage device and said housing and a dimensional footprint of said mass storage device alone are substantially the same when said standardized connector is inserted into said socket.

18. A system for electrically interconnecting at least one storage device having a first dimensional footprint to an external computing environment, comprising:
an external printed circuit board (PCB) separate from the storage device, the external PCB having one or more PCB electrical connection elements;
a storage device PCB connected to a bottom surface of the storage device and having at least one storage device connector portion; and
a connector attached to said storage device connector portion, the connector comprising a housing, at least one socket formed on a first surface of said housing for mating with one of said storage device PCB connector portion and said PCB electrical connection elements, and a plurality of spring-loaded contact pads formed on a second surface of said housing,
wherein said plurality of spring-loaded contact pads are springingly biased against an other of said storage device PCB connector portion and said PCB electrical connection elements when the storage device is deposited on the external PCB such that a solderless connection is formed between the storage device connection portion and the external PCB, and said housing is configured to have a size and shape such that a combined dimensional footprint of said storage device and said connector is substantially the same as said first dimensional footprint when said connector is attached to said storage device connector portion.

19. A solderless connection mechanism for electrically connecting an electronic peripheral device to a printed circuit board, the connection mechanism comprising:
a plurality of electrically conductive contact pads printed on a surface of the printed circuit board;
a first connector including a plurality of spring-loaded contact pads associated with the electronic peripheral device for electrically coupling with said plurality of electrically conductive contact pads on the printed circuit board such that the electronic peripheral device is electrically connected to the printed circuit board; and
an adapter, wherein said first connector is provided on said adapter, said adapter further comprising a second connector for mating with a device connector on said electronic peripheral device.

20. The solderless connection mechanism of claim 19, wherein said adapter further comprises at least two guide posts configured for insertion into at least two corresponding apertures in the printed circuit board for registering said plurality of spring-loaded contact pads of said first connector in proper orientation relative to said plurality of electrically conductive contact pads.

\* \* \* \* \*